United States Patent [19]

Levallard

[11] Patent Number: 5,489,193
[45] Date of Patent: Feb. 6, 1996

[54] ANTIVIBRATION SUPPORTS FOR HELICOPTER BLADES, AND A HELICOPTER ROTOR INCLUDING SUCH SUPPORTS

[75] Inventor: Patrice Levallard, Bry Sur Marne, France

[73] Assignee: Hutchinson, France

[21] Appl. No.: 282,017

[22] Filed: Jul. 29, 1994

[30] Foreign Application Priority Data

Jul. 29, 1993 [FR] France .................. 93 09358

[51] Int. Cl.[6] ................................. B63H 1/06
[52] U.S. Cl. .............. 416/140; 416/134 A; 267/140.13
[58] Field of Search ................ 416/106, 134 A, 416/140; 267/140.13, 140.12, 141.1, 141.2

[56] References Cited

U.S. PATENT DOCUMENTS

| | | |
|---|---|---|
| 3,202,412 | 8/1965 | Trask . |
| 4,458,888 | 7/1984 | Wolf et al. . |
| 4,566,677 | 1/1986 | Le Pierres . |
| 4,632,370 | 12/1986 | Ticks et al. . |
| 4,741,519 | 5/1988 | Dubos et al. ............ 267/140.13 |
| 4,790,521 | 12/1988 | Ide et al. ............... 267/140.13 |
| 5,009,403 | 4/1991 | Kato et al. ............. 267/140.13 |
| 5,040,775 | 8/1991 | Miyakawa ............... 267/140.13 |
| 5,042,967 | 8/1991 | Destardins ................ 416/134 A |
| 5,082,252 | 1/1992 | Miyamoto ............... 267/140.13 |
| 5,100,294 | 3/1992 | Crannage et al. .......... 416/140 A |
| 5,172,893 | 12/1992 | Bouhier et al. . |
| 5,251,884 | 10/1993 | Bouhier ............... 267/140.12 |
| 5,263,815 | 11/1993 | Brenner . |

FOREIGN PATENT DOCUMENTS

| | | |
|---|---|---|
| 0057774 | 8/1982 | European Pat. Off. . |
| 0097091 | 12/1983 | European Pat. Off. . |
| 0134839 | 3/1985 | European Pat. Off. . |
| 0322239 | 6/1989 | European Pat. Off. . |
| 0452169 | 10/1991 | European Pat. Off. . |
| 0492063 | 7/1992 | European Pat. Off. . |
| 1625389 | 7/1970 | Germany . |
| 2921828 | 12/1979 | Germany . |
| 4034573 | 5/1991 | Germany . |
| 4117129 | 11/1992 | Germany ............... 267/140.12 |
| 0172743 | 9/1985 | Japan .................. 267/140.12 |
| 2113934 | 5/1987 | Japan .................. 267/140.13 |
| 3176843 | 7/1988 | Japan .................. 267/140.12 |
| 2034436 | 6/1980 | United Kingdom . |

OTHER PUBLICATIONS

Patent Abstracts of Japan; vol. 14, No. 209 (M–968) (4152) 27 Apr. 1990 & JP-A-02 046 336 (Toyo Tire & Rubber Co Ltd) 15 Feb. 1990; abstract.

*Primary Examiner*—Edward K. Look
*Assistant Examiner*—Mark Sgantzos
*Attorney, Agent, or Firm*—Larson and Taylor

[57] ABSTRACT

The invention relates to an antivibration device comprising two rigid strength members that are parallel and perpendicular to a first axis Z, and at least one laminated element interposed between the two strength members, said laminated element being made up of alternating layers of a rigid material and of elastomer which are disposed perpendicularly to the first axis, said laminated element enabling the two strength members to move relative to each other along a second axis Y that is perpendicular to the first axis. According to the invention, the device further includes a hydraulic damper which presents at least two leakproof cavities that are deformable and that are interconnected by means of a narrow channel, the two leakproof cavities and the narrow channel being filled with a liquid, each leakproof cavity being defined, at least in part, by a deformable wall which is fixed to both of the strength members and which permits them to move relative to each other parallel to the second axis.

12 Claims, 2 Drawing Sheets

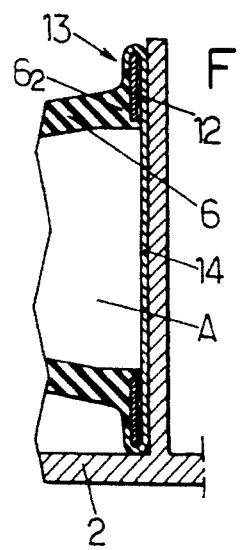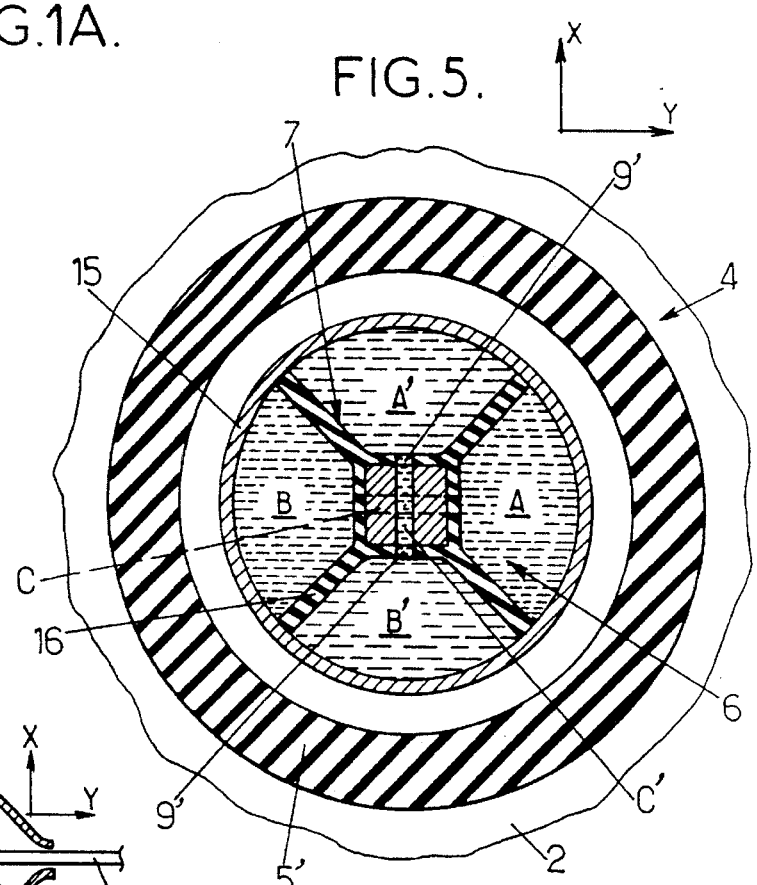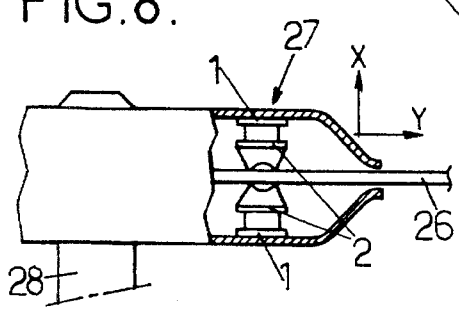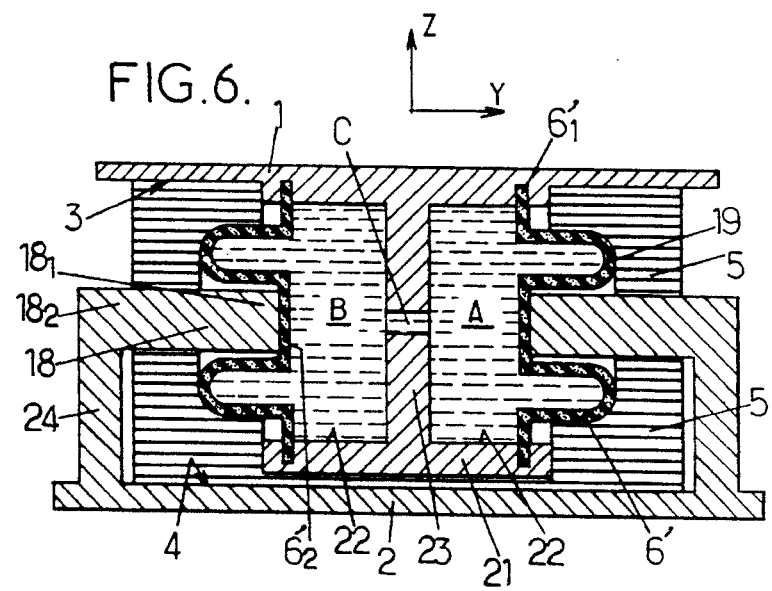

ANTIVIBRATION SUPPORTS FOR HELICOPTER BLADES, AND A HELICOPTER ROTOR INCLUDING SUCH SUPPORTS

FIELD OF THE INVENTION

The invention relates to antivibration supports for helicopter blades, and more particularly antivibration devices for mounting helicopter blades, said devices comprising:

first and second rigid strength members suitable for securing to respective ones of two rigid elements to be united, each strength member having a bearing face facing the other rigid strength member, the two bearing faces being disposed opposite each other and perpendicularly to a first axis Z; and at least one laminated element interposed between the two bearing faces, said laminated element having two opposite faces that are secured to respective ones of the two bearing faces, said laminated elements being made up of alternating layers of rigid material and of elastomer which are disposed perpendicularly to the first axis Z, said laminated element being capable of deforming to permit relative displacement of the two strength members along a second axis Y perpendicular to the first axis Z.

Thus, the two rigid strength members are prevented from moving significantly relative to each other along the first axis Z because of the high degree of stiffness of the laminated element parallel to the axis Z, whereas relative movement is possible between the members parallel to the second axis Y. The axis Z is orthogonal to the rotor blades.

In such devices, it is desirable to maximize damping of relative oscillatory or vibratory motion between the strength members parallel to the second axis Y.

BACKGROUND OF THE INVENTION

A known solution to that technical problem is to use a silicone elastomer in the elastomer layers of the laminated element, since silicone elastomers provide greater damping than conventional elastomers and provide both the stiffness and the damping that are desired.

However, with such laminated elements, a high level of damping is obtained to the detriment of lifetime.

OBJECTS AND SUMMARY OF THE INVENTION

A particular object of the present invention is to remedy that drawback.

To this end, an antivibration device of the kind in question essentially further comprises a hydraulic damper having at least two deformable leakproof chambers interconnected by a narrow channel, the two leakproof chambers and the narrow channel being filled with a liquid, each leakproof chamber being delimited, at least in part, by a deformable wall which extends between a first end secured to the first strength member and a second end secured to the second strength member, said deformable wall, on deforming, permitting relative movement of said first and second ends parallel to the second axis Y.

Thus, the relative oscillatory or vibratory movements of the two strength members along the axis Y cause liquid to be transferred from one leakproof chamber to the other via the narrow channel. At certain frequencies and amplitudes of the vibratory movement, which depend on the dimensions of the narrow channel, said narrow channel becomes the seat of head losses and of resonance phenomena suitable for providing very effective damping in the transmission of such oscillations from one strength member to the other.

Because damping in the direction of the axis Y is provided by the narrow channel and the leakproof chambers, it is possible to make the laminated elements out of an elastomer that provides little damping, but that has long lifetime under dynamic loading.

Furthermore, the shear stiffness of the laminated elements can be adjusted independently of the amount of damping to be provided along the axis Y.

In preferred embodiments, use is made of one or more of the following dispositions:

the deformable wall of each sealed chamber is made of elastomer and exerts a resilient return force on the strength members when it is deformed, thereby enabling the deformable wall to participate in obtaining the stiffness and damping that are necessary for limiting vibration;

the deformable walls of the two leakproof chambers are side walls which define said leakproof chambers perpendicularly to the second axis Y, the deformable walls being integrally formed in an elastomer body which presents a central portion connected in leakproof manner to the first ends of said deformable walls, said central portion defining a housing extending parallel to the first axis Z and open adjacent to the first strength member, said housing communicating with the two leakproof chambers via two respective openings, the first strength member including a fixing member which is engaged in sealed contact inside the housing, the narrow channel that interconnects the two leakproof chambers being formed through the fixing member and communicating with the openings of the housing;

the deformable walls flare towards their second ends;

the elastomer body is housed inside a rigid peripheral wall which extends from the second strength member along the first axis Z, the second end of each deformable wall being fixed to said rigid peripheral wall, said rigid peripheral wall being disposed between two laminated elements along a third axis X perpendicular to the first axis Z and to the second axis Y, the rigid peripheral wall constituting an abutment that limits deformation of the two laminated elements parallel to the third axis X;

the second end of each deformable wall is secured to a rigid frame and co-operates with said frame to form an outwardly directed peripheral flange on which a metal plate is crimped which closes said second end of the deformable wall;

the elastomer body further includes two additional leakproof chambers similar to the above-mentioned leakproof chambers, said additional leakproof chambers being in alignment along a third axis X that is perpendicular to the first axis Z and to the second axis Y, the housing including two additional openings that communicate with respective ones of said two additional leakproof chambers, the fixing member including an additional narrow channel putting the two additional leakproof chambers into communication with each other via the two additional openings, the second end of each deformable wall being secured to a rigid annular wall which extends from the second strength member along the first axis Z, the laminated element itself being annular and being disposed around the rigid annular wall;

each additional leakproof chamber is contiguous with both first-mentioned leakproof chambers that damp vibration along the second axis Y, and the deformable walls comprise radial partitions that are common to contiguous pairs of chambers;

each deformable wall is a flexible membrane that is circularly symmetrical about the second axis Y, the second end of each deformable wall being fixed to a corresponding rigid finger which extends along the second axis Y and which is secured to the second strength member, said second end of the deformable wall being adapted to penetrate inside said deformable wall, forming at least one annular fold;

the flexible membrane is made of elastomer and further includes reinforcement selected from the group comprising: fibers, threads, cloth, and rigid rings; and the device comprises two rigid guide rings which are secured to the first strength member and each of which presents an inside surface disposed around one of the flexible membranes and shaped to guide said flexible membrane by serving as a bearing surface therefor, each rigid finger also having an outside surface that is likewise shaped to guide a corresponding one of said flexible membranes by serving as a bearing surface therefor.

The invention also provides a helicopter rotor including a hub having an axis of rotation and blades fixed to the hub and each extending along a longitudinal axis that is substantially perpendicular to the axis of rotation, wherein each blade is fixed to the hub via at least one antivibration device as defined above, one of the strength members of said antivibration device being secured to the hub and its other strength member being secured to the blade, the first axis Z of the antivibration device being parallel to the axis of rotation of the hub, and the second axis Y of said antivibration device being parallel to the longitudinal axis of the blade.

BRIEF DESCRIPTION OF THE DRAWINGS

Other features and advantages of the invention appear from the following description of various embodiments of said invention, given as non-limiting examples and described with reference to the accompanying drawings.

In the drawings:

FIG. 1A is a view showing a detail of FIG. 1;

FIG. 5 is a section view similar to FIG. 2 but through a second embodiment of the invention;

FIG. 6 is a section view similar to FIG. 1, but for a third embodiment of the invention;

FIG. 7 shows a variant of the FIG. 6 antivibration support; and

FIG. 8 is a highly diagrammatic view illustrating the use of antivibration supports of the invention for assembling helicopter blades.

MORE DETAILED DESCRIPTION

In the various figures, the same references are used to designate elements that are identical or similar.

In all cases, the antivibration device of the invention is designed to be interposed between two rigid elements, and it comprises:

first and second rigid strength members 1 and 2 suitable for being secured to respective ones of the two rigid elements to be united, each strength member having a respective bearing face 3 or 4 facing the other rigid strength member, the two bearing faces being disposed opposite each other and perpendicularly to a first axis Z; and at least one laminated element 5 or 5' interposed between the two bearing faces 3 and 4, said laminated element being made up of alternating layers of a rigid material, in particular a metal, and of an elastomer, which layers extend perpendicularly to the first axis Z.

Figure 4:
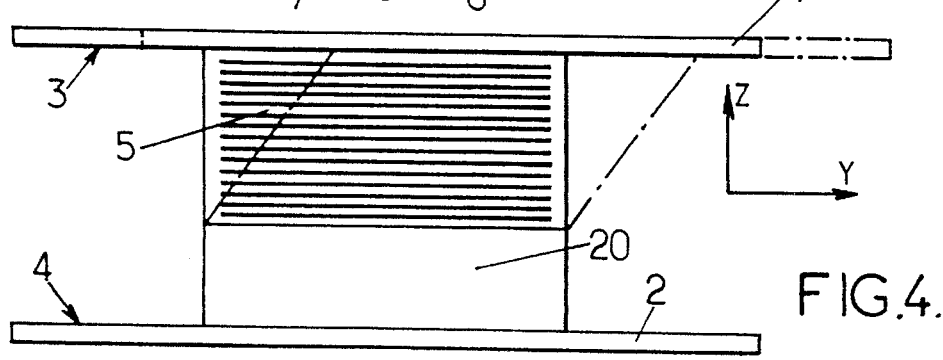
FIG. 4 is an elevation view of the FIG. 1 device looking along arrow IV of FIG. 3.

The laminated element 5 or 5' has two opposite faces which are secured to respective ones of the two strength members 1 and 2. The laminated element presents a high degree of stiffness parallel to the axis Z, thereby preventing the two strength members from moving relative to each other parallel to the axis Z. In contrast, the laminated element is deformable perpendicularly to the axis Z, i.e. along two axes X and Y that are perpendicular to the axis Z, such that relative displacement between the two strength members is possible along the axes X and Y. By way of example, the deformation of the laminated elements along the axis Y is represented in exaggerated manner by chain-dotted lines in FIG. 4. The stiffness of the device along the axes X and Y is essentially determined by the laminated element.

In addition, the device includes a hydraulic damper, designed to damp vibration between the two strength members in the direction of the axis Y. The hydraulic damper always has at least two leakproof chambers A and B which are deformable and interconnected by a narrow channel C, the two leakproof chambers and the narrow channel being filled with a liquid, optionally under pressure.

The two leakproof chambers are in alignment parallel to the axis Y, and each leakproof chamber is defined in part by a deformable wall 6 or flexible membrane 6' which extends between a first end $6_1$ or $6_1'$ secured to the first strength member 1 and a second end $6_2$ or $6_2'$ secured to the second strength member 2. The deformable walls permit relative movement of the two strength members parallel to the axis Y.

In the first embodiment of the invention as shown in FIGS. 1 to 4, the deformable walls 6 of the two leakproof chambers A and B are side walls in the form of truncated pyramids of square or rectangular base, that extend parallel to the axis Y from their first ends $6_1$ to their second ends $6_2$, and that flare towards their second ends $6_2$.

The deformable walls 6 are integrally formed in an elastomer body 7 that presents a central portion 8 which is connected in leakproof manner to the first ends $6_1$ of said deformable walls. This central portion 8 defines a housing $8_1$ that extends parallel to the axis Z and that is open at its end adjacent to the first strength member 1. The housing $8_1$ communicates with the leakproof chambers A and B via two openings 9.

The first strength member 1 includes a fixing rod 10 which is engaged in leakproof contact within the housing $8_1$, and the narrow channel C that interconnects the two leakproof chambers is a bore formed through the fixing rod 10 and that communicates with the openings 9 of the housing $8_1$.

To simplify the drawings, the fixing rod 10 has been shown as being integrally formed with the first strength member 1. In reality, the rod 10 is a part that is distinct from the strength member 1: the elastomer body 7 is first molded over the rod 10, and subsequently the rod 10 is securely fixed to the strength member 1, e.g. by screw means.

The elastomer body 7 is situated inside a rigid peripheral wall 11 which is secured to the second strength member 2 and which extends along the axis Z from the second strength member. When seen in section on a plane perpendicular to the axis Z, this peripheral wall 11 includes two facing plane portions $11_1$ parallel to the axis Y and interconnected at their ends by two curved portions $11_2$ constituting circular arcs, with the concave sides of the curved portions $11_2$ facing towards the inside of the peripheral wall.

The rigid peripheral wall 11 is disposed between two laminated elements 5 disposed on either side thereof along the axis X. In the example shown, these elements are fixed to rigid bases 20 themselves fixed to the bearing face 4 of the second strength member.

The plane portions $11_1$ of the rigid peripheral wall 11 constitute abutments that limit the deformation of the laminated elements 5 parallel to the axis X, thereby limiting relative displacement of the two strength members 1 and 2 parallel to the axis X.

The second end $6_2$ of each deformable wall 6 is secured to a rigid frame 12 that is generally made of metal and it co-operates with said frame to form an outwardly directed peripheral flange 13 on which a metal plate 14 is crimped to close said second end of the deformable wall 6.

The metal plates 14 are complementary in shape to the curved portions $11_2$ of the rigid peripheral wall 11, and they bear against said curved portions to secure the second end $6_2$ of each deformable wall 6 to the second strength member 2.

When the first strength member 1 is subjected to vibration or oscillation in the direction of the axis Y, the liquid is transferred back and forth from one leakproof chamber to the other via the narrow channel C. At certain frequencies and amplitudes of vibration, the narrow channel C becomes the seat of head losses and of resonance phenomena which considerably damp the vibration, such that said vibration is transmitted in attenuated manner to the second strength member 2.

In addition, the deformable walls 6 have a resilient return effect on the first strength member 1 and thus participate in damping the vibration, in association with the laminated elements.

The second embodiment of the invention as shown in FIG. 5 has numerous points in common with the first embodiment. However, the device no longer has two laminated elements 5, but has a single laminated element 5' that is annular in shape, being constituted by a stack of washers alternately made of metal and of elastomer, the element being placed around the rigid peripheral wall 15 which, in this case, is circular.

In addition, the elastomer body 7 further includes two additional leakproof chambers A' and B' that are identical to the leakproof chambers A and B, but that are in alignment on the axis X.

Also, the housing $8_1$ includes two additional openings 9' that communicate respectively with the two additional leakproof chambers A' and B', and the fixing rod 10 includes a second bore C' formed parallel to the axis X and at a different height to the bore C, thereby constituting an additional narrow channel that puts the additional leakproof chambers A' and B' into communication with each other via the two additional openings 9' of the housing $8_1$.

Finally, each additional leakproof chamber A', B' is contiguous with both leakproof chambers A and B, and the deformable walls 6 that define the leakproof chambers comprise radial partitions 16 that are common to pairs of contiguous chambers.

In the third embodiment of the invention as shown in FIG. 6, each deformable wall is a flexible membrane 6' which is circularly symmetrical about the axis Y. By way of example, the membrane may be made of an elastomer that is reinforced by fibers, threads, cloth, or rigid rings that are concentric with the axis Y. The membrane 6' may also be made in the form of a thin wall of metal or of some other material having a high modulus of elasticity.

The first strength member 1 includes a rigid body 21 situated adjacent to the second strength member 2 and defining two cylindrical chambers 22 that are circularly symmetrical about the axis Y. The cylindrical chambers 22 are axially open to the outside and they are separated by a plane partition 23 that is perpendicular to the axis Y, and having a bore formed therein to constitute the narrow channel C.

The second strength member 2 includes two fingers 18 each extending parallel to the axis Y between a respective first end $18_1$ that is free and situated adjacent to the partition 23, and a second end $18_2$ that is secured to the second strength member 2 by means of a vertical support 24.

The first end of each flexible membrane 6' is an outwardly directed peripheral rim $6_1'$ of said membrane, and is fixed to the inside of one of the cylindrical chambers 22. In addition, the second "end" $6_2'$ of each flexible membrane is constituted by the center of said membrane, and is fixed to the free end $18_1$ of one of the fingers 18.

Each flexible membrane 6' forms an annular fold 19 around the corresponding finger 18, such that said flexible membrane 6' enables a large amount of movement to take place between the two strength members 1 and 2 along the axis Y.

Figure 1:
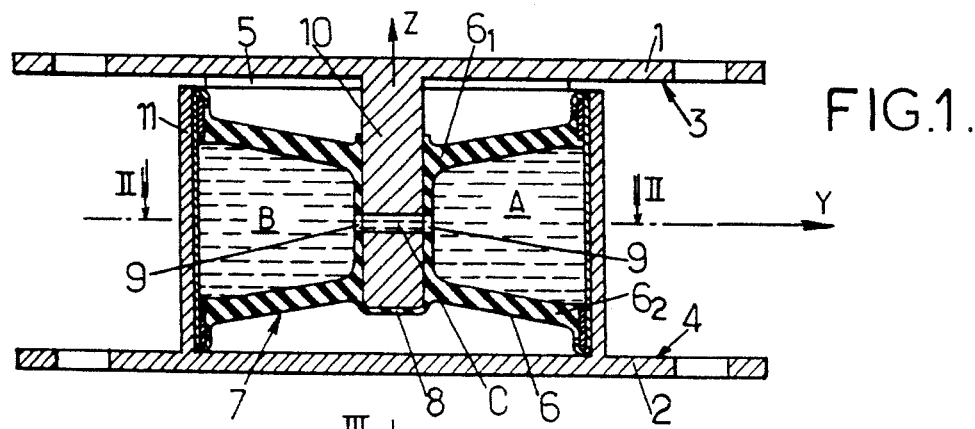
FIG. 1 is a section view of an antivibration device constituting a first embodiment of the invention shown in section on line I—I of FIG. 2.
Figure 2:
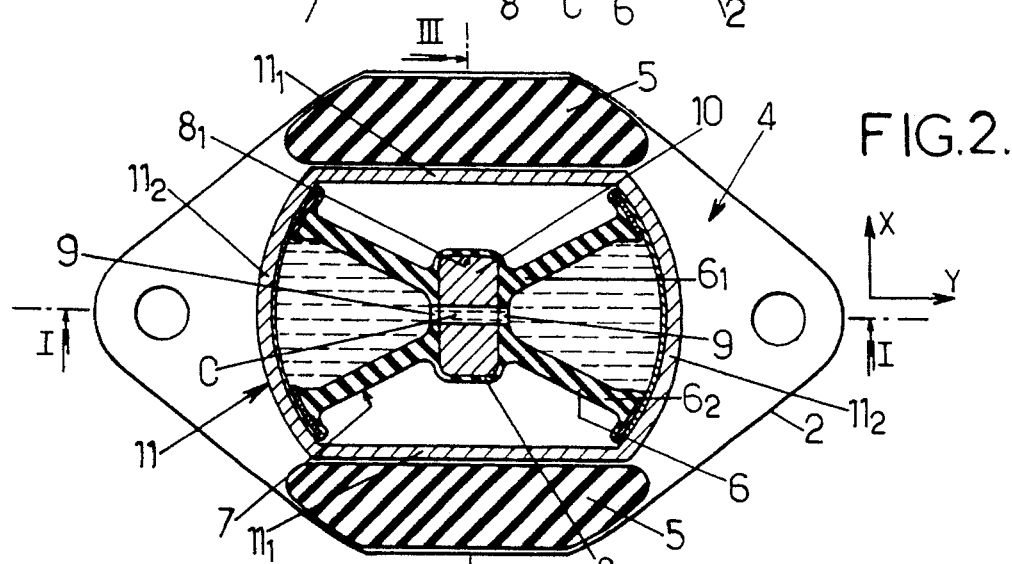
FIG. 2 is a section view of the FIG. 1 device on line II—II of FIG. 1.
Figure 3:
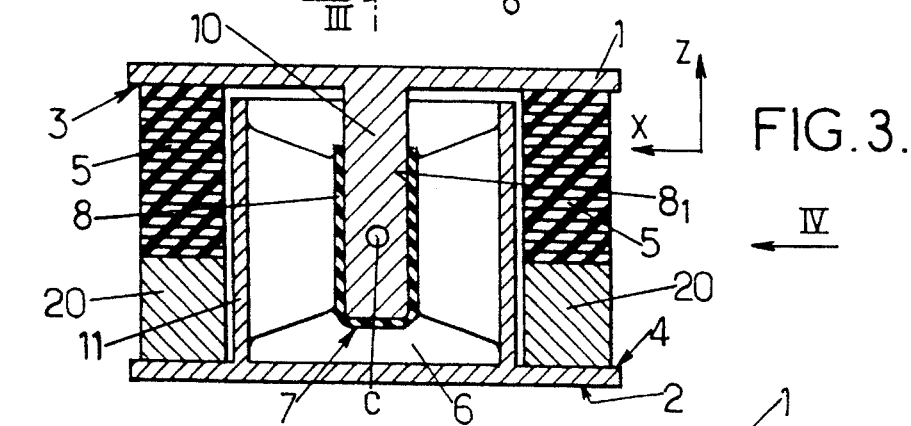
FIG. 3 is another section view of the FIG. 1 device on line III—III of FIG. 2.

As in the example of FIG. 1, the hydraulic damper is disposed between two laminated elements 5 on the axis X. As in the first embodiment, the laminated elements can be formed parallel to the axis Y, but their deformation parallel to the axis X is limited by abutment against the body 21.

This configuration makes large amounts of relative displacement possible with low stiffness along the axis Y, while being capable of withstanding a high degree of pressure.

As shown in FIG. 7, in order to limit expansion of the flexible membrane 6' in operation while it is being subjected to a high level of internal pressure, it is possible to provide an annular guide 25 that is concentric with each of the fingers 18 and integral with the first strength member 1, the membrane 6' bearing against the inside surface thereof and also bearing against the outside surface of the finger 18.

The guide may have a circularly cylindrical inside surface, or it may have corrugations or other annular shapes for guiding the membrane 6'.

One possible way of mounting helicopter blades 26 in a helicopter rotor 27 is shown by way of example in FIG. 8.

In this mount, each helicopter blade 26 is fixed to the second strength members 2 of two antivibration devices as described above, the two antivibration devices being disposed on either side of the plane of the blade 26 with the axis Y of said two antivibration devices being parallel to the longitudinal direction of the blade 26.

In addition, the first strength members 1 of the two antivibration devices are fixed to the hub 28 of the rotor whose axis of rotation is parallel to the axis Z of the antivibration supports.

I claim:

1. An antivibration device for helicopter blades comprising:

first and second rigid strength members, each of said strength members having a bearing face facing the other rigid strength member, the two bearing faces being disposed opposite each other and perpendicularly to a first axis;

at least one laminated element interposed between the two bearing faces, said laminated element having two opposite faces secured to respective bearing faces, said laminated elements comprising alternating layers of rigid material and elastomer disposed perpendicularly to the first axis, said laminated element being deformable for permitting relative displacement of the two strength members along a second axis perpendicular to the first axis; and a hydraulic damper having at least two deformable leakproof chambers interconnected by a narrow channel, the two leakproof chambers and the narrow channel being filled with a liquid, at least a portion of each leakproof chamber being delimited by a deformable wall extending between a first end secured to the first strength member and a second end secured to the second strength member, said deformable wall, on deforming, permitting relative movement of said first and second ends parallel to the second axis.

2. A device according to claim 1, wherein the deformable wall of each of said leakproof chambers comprises an elastomer and exerts a resilient return force on the strength members when said deformable wall is deformed.

3. A device according to claim 1, wherein the deformable walls of the two leakproof chambers comprise side walls defining said leakproof chambers perpendicularly to the second axis, the deformable walls being integrally formed in an elastomer body having a central portion connected in leakproof manner to the first ends of said deformable walls, said central portion defining a housing extending parallel to the first axis and open adjacent to the first strength member, said housing communicating with the two leakproof chambers via two respective openings, the first strength member including a fixing member engaged in sealed contact inside the housing, the narrow channel that interconnects the two leakproof chambers being formed through the fixing member and communicating with the openings of the housing.

4. A device according to claim 3, wherein the deformable walls flare towards their second ends.

5. A device according to claim 3, wherein the elastomer body is housed inside a rigid peripheral wall extending from the second strength member along the first axis, the second end of each deformable wall being fixed to said rigid peripheral wall, said rigid peripheral wall being disposed between two laminated elements along a third axis perpendicular to the first axis and to the second axis, the rigid peripheral wall constituting an abutment that limits deformation of the two laminated elements parallel to the third axis.

6. A device according to claim 3, wherein the second end of each deformable wall is secured to a rigid frame and co-operates with said frame to form an outwardly directed peripheral flange on which a metal plate is crimped to close said second end of the deformable wall.

7. A device according to claim 4, wherein the elastomer body further includes two additional leakproof chambers, said additional leakproof chambers being in alignment along a third axis perpendicular to the first axis and to the second axis, the housing including two additional openings that communicate with respective additional leakproof chambers, the fixing member including an additional narrow channel putting the two additional leakproof chambers into communication with each other via the two additional openings, the second end of each deformable wall being secured to a rigid annular wall extending from the second strength member along the first axis, the laminated element being annular and being disposed around the rigid annular wall.

8. A device according to claim 7, wherein each additional leakproof chamber is contiguous with both first-mentioned leakproof chambers that damp vibration along the second axis, and the deformable walls comprise radial partitions common to contiguous pairs of chambers.

9. A device according to claim 1, wherein each deformable wall comprises a flexible membrane circularly symmetrical about the second axis, the second end of each deformable wall being fixed to a corresponding rigid finger extending along the second axis and secured to the second strength member, said second end of the deformable wall penetrating inside said deformable wall, forming at least one annular fold.

10. A device according to claim 9, wherein the flexible membrane comprises an elastomer and further includes reinforcement selected from the group consisting of: fibers, threads, cloth, and rigid rings.

11. A device according to claim 9, further including two rigid guide rings secured to the first strength member and each of said guide rings having an inside surface disposed around one of the flexible membranes and shaped to guide said flexible membrane by serving as a bearing surface therefor, each rigid finger having an outside surface shaped to guide a corresponding one of said flexible membranes by serving as a bearing surface therefor.

12. A helicopter rotor including a hub having an axis of rotation and blades fixed to the hub and extending along a longitudinal axis substantially perpendicular to the axis of rotation, each blade being fixed to the hub via at least one antivibration device comprising:

first and second rigid strength members, each of said strength members having a bearing face facing the other rigid strength member, the two bearing faces being disposed opposite each other and perpendicularly to a first axis;

at least one laminated element interposed between the two bearing faces, said laminated element having two opposite faces secured to respective bearing faces, said laminated elements comprising alternating layers of rigid material and elastomer disposed perpendicularly to the first axis, said laminated element being deformable for permitting relative displacement of the two strength members along a second axis perpendicular to the first axis; and a hydraulic damper having at least two deformable leakproof chambers interconnected by a narrow channel, the two leakproof chambers and the narrow channel being filled with a liquid, at least a portion of each leakproof chamber being delimited by a deformable wall extending between a first end secured to the first strength member and a second end secured to the second strength member, said deformable wall, on deforming, permitting relative movement of said first and second ends parallel to the second axis; one of the strength members of said antivibration device being secured to the hub and the other strength member being secured to the respective blade, the first axis of the antivibration device being parallel to the axis of rotation of the hub, and the second axis of said antivibration device being parallel to the longitudinal axis of the blade.

* * * * *